United States Patent [19]

Kanai

[11] Patent Number: 5,161,241
[45] Date of Patent: Nov. 3, 1992

[54] CRT POWER SUPPLY APPARATUS HAVING SYNCHRONIZED HIGH AND LOW VOLTAGE POWER SUPPLY SWITCHING CIRCUITS

[75] Inventor: Toshio Kanai, Takatsuki, Japan

[73] Assignee: Matsushita Electric Industrial Co., Ltd., Osaka, Japan

[21] Appl. No.: 813,061

[22] Filed: Dec. 23, 1991

Related U.S. Application Data

[63] Continuation of Ser. No. 581,751, Sep. 13, 1990, abandoned.

[30] Foreign Application Priority Data

Sep. 13, 1989 [JP] Japan .................. 1-237777

[51] Int. Cl.⁵ .................................. H01J 29/70
[52] U.S. Cl. .................................. 363/65; 363/21; 315/408; 315/411; 358/190
[58] Field of Search .......... 315/411, 408; 358/190; 363/65, 21; 323/267

[56] References Cited

U.S. PATENT DOCUMENTS

| | | | |
|---|---|---|---|
| 4,115,814 | 9/1978 | Kosaka et al. | 358/243 |
| 4,118,739 | 10/1978 | Umehara | 358/190 |
| 4,215,296 | 7/1980 | Mitamura et al. | 315/408 |
| 4,489,253 | 12/1984 | Godawski | 315/8 |
| 4,761,723 | 8/1988 | Lendaro | 363/21 |
| 4,812,719 | 3/1989 | Stephens et al. | 315/411 |
| 5,013,980 | 5/1991 | Stephens et al. | 315/411 |

*Primary Examiner*—Steven L. Stephan
*Assistant Examiner*—Ben Davidson
*Attorney, Agent, or Firm*—Wenderoth, Lind & Ponack

[57] ABSTRACT

A power supply circuit for a CRT display device includes a low-voltage power supply switching circuit for supplying power to a horizontal oscillation circuit of the CRT display device, and a high-voltage power supply switching circuit for supplying power to high-voltage circuits of the CRT display device. The low-voltage power supply switching circuit includes an oscillator and a switching transistor. The oscillator is triggered by an output of the horizontal oscillation circuit, and the conductive state of the switching transistor is controlled according to an output of the oscillator. The high-voltage power supply switching circuit includes a switching transistor. The conductive state of the switching transistor of the high-voltage power supply switching circuit is controlled according to an output of the low-voltage power supply switching circuit. As such, the switching operations of the low-voltage and high-voltage power supply switching circuits is carried out at a same frequency and in synchronism with the output of the horizontal oscillation circuit.

1 Claim, 2 Drawing Sheets

CRT POWER SUPPLY APPARATUS HAVING SYNCHRONIZED HIGH AND LOW VOLTAGE POWER SUPPLY SWITCHING CIRCUITS

This application is a continuation of now abandoned application Ser. No. 07/581,751 filed on Sep. 13, 1990.

BACKGROUND OF THE INVENTION

The present invention generally relates to a computer terminal CRT display apparatus, and more particularly, to a power supply apparatus therefor.

Generally, the CRT power supply apparatus employs a switching power supply circuit (or switching regulator) which converts a rectified voltage into a high frequency AC voltage by carrying out a switching operation, and which thereafter rectifies the high frequency AC voltage to obtain a direct current. In order to prevent the noises caused by the switching operation of the power supply from interrupting the horizontal synchronization, the switching is conventionally adapted to be synchronized by using the horizontal output pulse as a trigger.

A low-tension output power supply is sometimes employed, except for the horizontal output circuit, as the power supply. The switching of such a low-tension output power supply is self-operated in that triggering is not applied by the horizontal output pulse. When the horizontal output circuit or the power supply thereof malfunctions, the horizontal output pulse is not generated. If the low-tension output power supply is triggered with the pulse, the power supply also does not operate properly, so that the entire apparatus becomes inoperative. Thus, identifying the location of the breakdown is difficult. Therefore, the switching noises caused by the low-tension output power supply are not synchronized with the horizontal output circuit. If it should malfunction, only a condition where the low-tension output power supply has not broken down is adapted to be judged at least.

Although the conventional television is required to be horizontally synchronized only in the high-tension output power supply, the high-precision CRT display apparatus recently employed for computer usage entails a problem in that noises caused by the low-tension voltage output power supply are not synchronized with the horizontal output circuit. As such, noises of the display may be conspicuous due to the disturbances of the operations of the horizontal oscillating circuit and the horizontal output circuit.

SUMMARY OF THE INVENTION

Accordingly, the present invention has been developed with a view to substantially eliminating the above discussed drawbacks inherent in the prior art, and has as its essential object the provision of an improved CRT display apparatus.

Another important object of the present invention is to provide a CRT display apparatus which is adapted to eliminate picture disturbances caused by interruptions of the horizontal output circuit.

In accomplishing these and other objects, according to one preferred embodiment of the present invention, there is provided a CRT display apparatus in which a low-tension output power supply is triggered by a horizontal oscillation circuit output signal, rather than the output signal of the horizontal output circuit, and in which a high-tension output power supply is triggered by an output pulse of the low-tension output power supply.

The CRT display apparatus of the present invention of such construction as described hereinabove, together with the low-tension output power supply, and the high-tension output power supply, effects a switching operation which is synchronized with the horizontal oscillation output.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
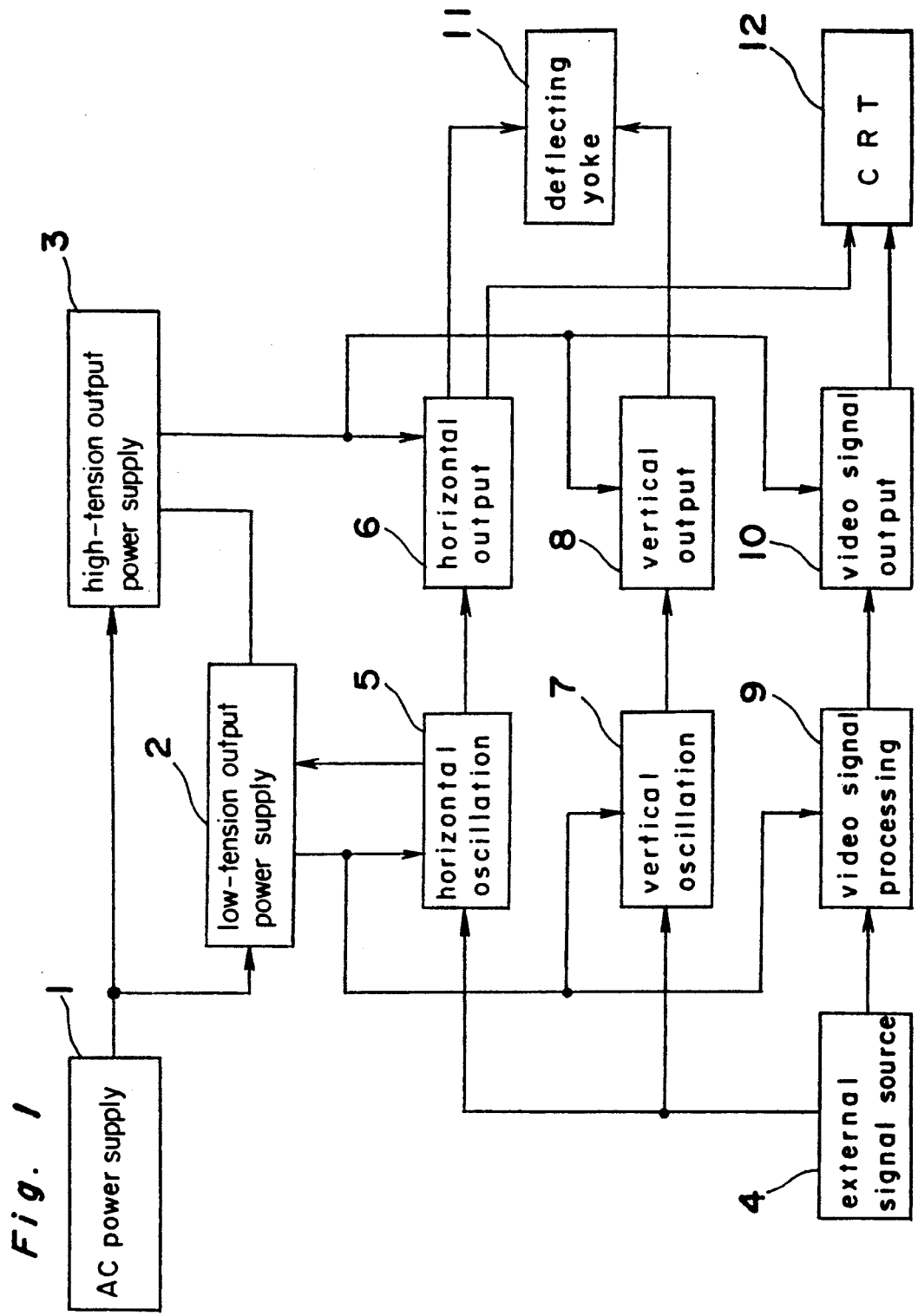
FIG. 1 is a block diagram of a CRT display apparatus in one embodiment of the present invention.

Before the description of the present invention proceeds, it is noted that like parts are designated by like reference numerals throughout the accompanying drawings.

Referring now to the drawings, there is shown in FIG. 1 a block diagram of a CRT display apparatus in one embodiment of the present invention which includes: an AC power supply 1; a low-tension output power supply 2 of a switching regulator system, having, for example, an output power supply voltage (DC voltage) of 12V; a high-tension output power supply 3 of a switching regulator system, having, for example, an output power supply voltage (DC voltage) of 100V; an external signal source 4 such as a computer main body; a horizontal oscillation circuit 5; a horizontal output circuit 6; a vertical oscillation circuit 7; a vertical output circuit 8; a processing circuit 8 for processing picture signals received from the external signal source 4; a picture output circuit 10; a deflection yoke 11 including a horizontal deflecting coil and a vertical deflection coil; and a cathode-ray tube (CRT) 12 as a display element. The horizontal oscillation circuit 5, the vertical oscillation circuit 7, and the picture processing circuit 9 receive operating power from the power supply voltage of the low-tension output power supply 2. The horizontal output circuit 6, the vertical output circuit 8, and the picture output circuit 10 receive operating power from the power supply voltage of the high-tension output power supply 3. Additionally, the low-tension output power supply 2 is adapted to effect a switching operation utilizing the horizontal oscillation output signal as a trigger pulse. The high-tension output power supply 3 is adapted to effect a switching operation utilizing an output pulse of the low-tension output supply 2 as a trigger pulse.

Figure 2:
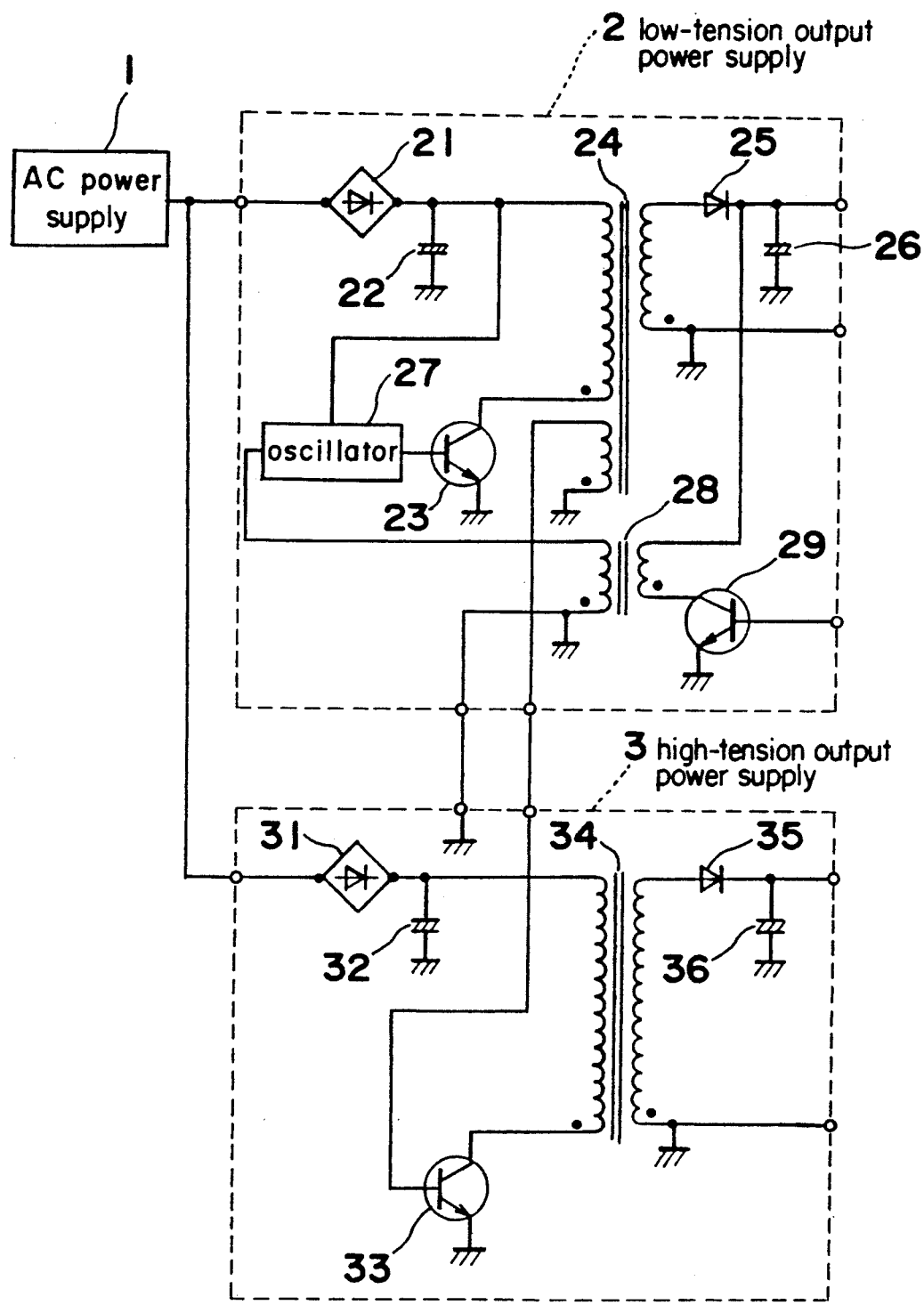
FIG. 2 is an embodying circuit in one embodiment of a power supply of the present invention.

FIG. 2 shows one embodiment of the low-tension voltage output power supply 2 and the high-tension output power supply 3 which includes: bridge rectifiers 21, 31 for rectifying an input AC voltage; capacitors 22, 32 for smoothing the rectified voltage; output transistors 23, 33 for effecting a switching function; output transformers 24, 34 for generating an output AC voltage upon transforming the voltage generated by the switching function of the output transistors 23, 33; rectifiers 25, 35 for rectifying the output AC voltage of the output transformers 24, 34; capacitors 26, 36 for smoothing the rectified voltage; an oscillator 27 which generates an oscillation frequency which may be several times an externally applied trigger frequency; a transformer 28 for feeding pulse voltages to the oscillator 27; and a transistor 29 having a collector and emitter connected between one of the primary winding of a transformer 28 and the reference electric potential, and having a base connected to the horizontal oscillation circuit 5 for receiving the horizontal oscillation output signals. The output transistor 33 has its collector and emitter connected between one end of the primary winding of the transformer 34 and the reference electric potential, and has applied to its base a pulse outputted from the tertiary winding of the transformer 24 of the low-tension output power supply 2.

Upon rectifying the input AC voltage, the oscillator 27 is oscillated so as to feed an oscillation voltage into the base of output transistor 23. Since the output transistor 23 repeatedly and intermittently conducts in accordance with the oscillation voltage, a pulse current flows equivalent to the inductance of the output transformer 24. This current is amplified by the output transformer 24, and rectified by the rectifier 25 and capacitor 26, and the resultant low-tension power supply voltage is fed to the respective circuits 5, 7, 9 which are to be powered at a low voltage. As a result, when the horizontal oscillating circuit 5 is operated, the horizontal oscillation output signal is fed to the base of the transistor 29, and the output signal of the transistor 29 is applied to the trigger input terminal of the oscillator 27 via the transformer 28, whereby the output oscillation voltage of the oscillator 27 is synchronized with the horizontal oscillator output signal. In this manner, the output pulse of the low-tension output power supply 2 is synchronized with the horizontal oscillation output signal.

The output voltage from the tertiary winding of the output transformer 24 of the low-tension output power supply 2 is applied to the base of the output transistor 33 of the high-tension output power supply 3. The transistor 33 becomes conductive during each period in which the input thereof is positive, and the transistor 33 is turned off during each negative period. Thus, an output voltage is generated in the high-tension output power supply 3 in the same basic manner as in the low-tension output power supply 2. When the output transistor 23 becomes conductive, the collector voltage thereof becomes zero, and the voltage of the tertiary winding of the output transformer 24 becomes positive, whereby the output transistor 33 becomes conductive. When the output transistor 23 is turned off, the collector voltage thereof becomes positive and the tertiary winding of the output transformer 24 becomes negative, whereby the output transistor 33 is turned off. Since the two output transistors 23, 33 are together switched on and off in this manner, the outputs of both of the power supply 2 and 3 are synchronized with the horizontal oscillation output signal.

As is clear from the foregoing description, the CRT display apparatus of the present invention is simple in construction. Since both the low-tension output power supply 2 and the high-tension output power supply 3 are operated in synchronization with the horizontal oscillation circuit 5, noise-free pictures may be stably displayed.

Although the present invention has been fully described by way of the example with reference to the accompanying drawings, it is noted that various changes and modifications will be apparent to those skilled in the art. Therefore, unless such changes and modifications depart from the scope of the present invention, they should be construed as included therein.

What is claimed is:

1. An apparatus for supplying power to a CRT display device, the CRT display device including a horizontal oscillation circuit and a horizontal output circuit, said apparatus comprising:
    a first power supply switching circuit for supplying power to the horizontal oscillation circuit, wherein said first power supply switching circuit is triggered by an output of the horizontal oscillation circuit, and
    a second power supply switching circuit for supplying power to the horizontal output circuit, wherein said second power supply switching circuit is triggered by an output of said first power supply switching circuit, wherein a switching operation of said first and second power supply switching circuits is effected at a same frequency.

* * * * *